United States Patent [19]

Koop et al.

[11] 4,225,262
[45] Sep. 30, 1980

[54] NIOBIUM COATINGS FOR JOINING CERAMIC TO METAL

[75] Inventors: Nicholas S. Koop, St. Paul; William J. Morrissey, Champlin, both of Minn.

[73] Assignee: Medtronic, Inc., Minneapolis, Minn.

[21] Appl. No.: 2,618

[22] Filed: Jan. 11, 1979

[51] Int. Cl.² ............................................ B23K 1/04
[52] U.S. Cl. .................................. 403/272; 228/124
[58] Field of Search .......................... 403/272, 29, 30; 228/122, 124

[56] References Cited

U.S. PATENT DOCUMENTS

| | | | |
|---|---|---|---|
| 2,842,699 | 7/1958 | Germeshausen et al. | 403/272 X |
| 3,339,267 | 9/1967 | Bronnes et al. | 228/124 |
| 3,594,895 | 7/1971 | Hill | 228/122 |
| 3,940,050 | 2/1976 | Johnson et al. | 228/124 X |

Primary Examiner—Andrew V. Kundrat
Attorney, Agent, or Firm—Schroeder, Siegfried, Ryan, Vidas, Steffey & Arrett

[57] ABSTRACT

Use of niobium coatings in brazing ceramic and metal bodies particularly for forming hermetic ceramic-metal seals.

13 Claims, 1 Drawing Figure

U.S. Patent    Sep. 30, 1980    4,225,262
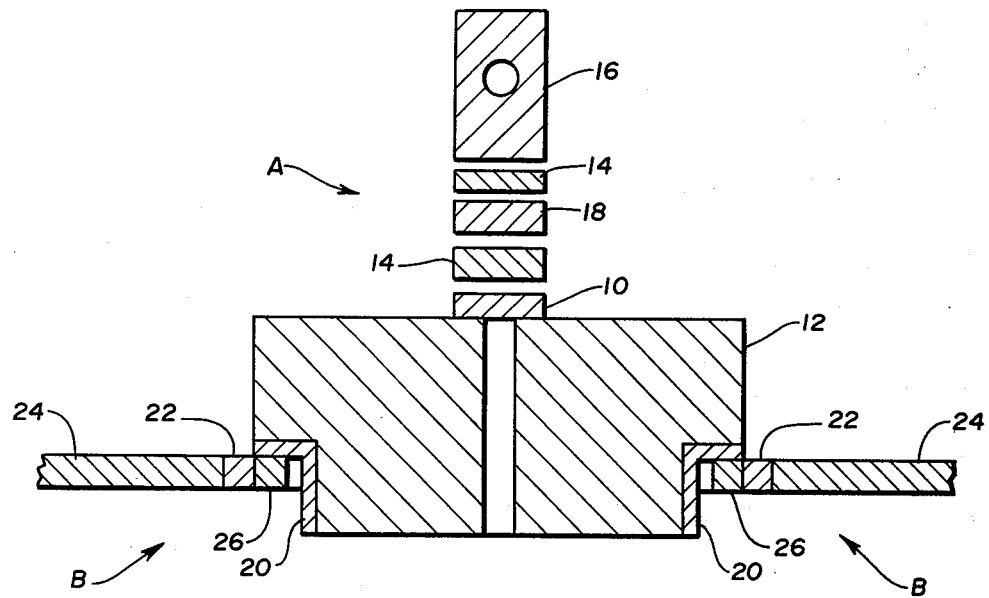

NIOBIUM COATINGS FOR JOINING CERAMIC TO METAL

BACKGROUND

Various articles incorporate ceramic-metal joints and/or seals. This invention relates to ceramic-metal joints and hermetic seals using niobium coatings. It also relates to methods of forming such joints and seals. It specifically relates to joints and seals formed between ceramic and titanium.

It is ordinary practice in joining ceramic to metal to first metallize the ceramic. For example, when joining alumina to titanium, a coating of titanium may be sputtered onto the alumina workpiece following which the titanium workpiece is brazed to the coated alumina with a suitable brazing material such as gold. In the case of sputtered titanium on alumina, the coefficient of expansion for the titanium is $94 \times 10^{-7}$ cm/cm/°C. as compared to $69-71 \times 10^{-7}$ cm/cm/°C. for the alumina. This differential is a source of stress and cracking, particularly as coating thickness increases.

It is a purpose of this invention to use niobium as the ceramic coating whereby the stresses are greatly reduced and the risk of crack formations is minimized. This results in higher quality joints and, as pointed out below, in higher quality hermetic seals.

It is also difficult to provide a sound joint between ceramic and titanium because the titanium tends to migrate into the braze material used for forming the joint between the ceramic and the titanium. Typically, the preferred braze material for joining or sealing ceramic and titanium components has been gold. The migration of titanium into the braze material eg., gold, causes changes in the properties of the brazed joint or seal. For example, in the case of gold, it causes embrittlement and high stresses in the gold. The result is that such seals and joints develop micro and macro cracks. In the case of seals, this is a threat to hermeticity.

One approach to solving these difficulties has been found in the prior art use of platinum components which serve as a barrier to the titanium migration. However, platinum components are initially expensive and their assembly is time consuming.

SUMMARY OF THE INVENTION

In accordance with this invention it has been discovered that a thin coating of niobium in a joint area on a ceramic workpiece minimizes stressing of the ceramic.

More importantly, the additional use of a thin coating of niobium on the joint area of a titanium workpiece, to be joined to the ceramic workpiece, prevents the migration of titanium into the braze material to not only substantially prevent stressing and cracking of the ceramic but of the brazed joint as well, thereby providing an improved hermetic seal therebetween.

The use of alternate materials, such as platinum rather than niobium, to prevent titanium migration has been found less cost effective since larger quantities of the alternate materials must be used than are used with the relatively thin niobium coatings according to this invention. Also, the need for additional quantities of the alternate materials results in much thicker coatings which are generally undesirable, particularly from a stress standpoint.

BRIEF DESCRIPTION OF THE DRAWING

The single drawing FIGURE demonstrates schematically the formation of both a joint and a hermetic seal between ceramic and titanium workpieces.

DESCRIPTION OF THE PREFERRED EMBODIMENT

In accordance with one aspect of this invention, as shown for a joint at A in the drawing FIGURE, a niobium coating 10 is prepared as a base metallization bond on a ceramic component 12, such as a feedthrough insulator 12 of alumina, zirconia or the like. The coating allows subsequent brazing to the ceramic, generally using gold braze material 14, in order to attach a metal component to the ceramic. For the particular case illustrated, a titanium component or part 16 is to be joined to the niobium coated portion of ceramic component 12 by brazing with a quantity of tantalum 18 and the two quantities of gold 14, as shown in exploded view.

The niobium bonds readily to the ceramic. For example, a 5000 angstrom thick coating of sputtered niobium has a fracture value of 14,216 PSI. Preferably, the niobium coating will have a thickness of between about 5000—10,000 angstroms. However, the thickness may be increased or decreased depending on the particular application. The preferred method of applying the niobium is by sputtering. However, other methods may be used.

Another advantage is using niobium for the metallization of ceramic is its coefficient of expansion. It is closely matched to alumina ($Al_2O_3$ $68-71 \times 10^{-7}$ cm/cm/°C., Nb $73.9 \times 10^{-7}$ cm/cm/°C.) over the temperature range of 20°–400° C. Thus, there is less stress during thermal cycling. Note that the value for titanium over the same temperature range is $91 \times 10^{-7}$ cm/cm/°C.

Following the bonding of the niobium to the ceramic, the other components are positioned together and the assembly is heated to a brazing temperature whereby component 16 is joined to component 12.

In accordance with a second aspect of this invention, as shown for a hermetic seal at B in the drawing FIGURE, a niobium coating 20 is prepared on a ceramic component 12, such as electrical insulator for a feedthrough or the like, and another coating 22 of niobium is prepared on a metal component 24, such as a titanium ferrule, casing or the like.

Upon positioning the components together with a quantity of brazing material, as gold 26 for example, and heating, ceramic 12 may be hermetically sealed to the titanium workpiece 24 by brazing. The components are shown at B in position for heating to the brazing temperature.

Brazing is typically carried out in vacuum. When using gold, the brazing temperature will be on the order of 1000-1100° C.

The niobium blocks the migration of titanium into the gold. This results in better flowout of the gold braze. Also, the gold remains more ductile due to the niobium blocking effect on the migration of titanium thereby reducing stresses due to the high stress-strain values resulting from migration.

Having described the invention, the exclusive property rights claimed therein are defined in the following claims.

What is claimed is:

1. An article including a ceramic-metal joint, the article comprising a ceramic component and a metal component defining a joint area therebetween, the ceramic component including a coating of niobium thereon in the joint area, and a braze material in the joint area joining the components together by virtue of its being fused to the niobium coating and to the metal component.

2. The article of claim 1 wherein the metal component is titanium and the braze material is gold.

3. The article of claim 2 wherein the ceramic is an alumina.

4. The article of claim 2 wherein the metal component also includes a niobium coating in the joint area and the joint is a hermetic seal.

5. The article of claim 4 wherein the niobium coatings are about 5000 to about 10,000 angstroms thick.

6. The article of claim 4 wherein the ceramic is alumina, the metal is titanium and the braze material is gold.

7. The method of joining a ceramic component to a metal component comprising:
   coating the components with niobium in the area to be joined;
   interposing an amount of braze material between the components and establishing contact between the components and the braze material, and
   heating the components and braze material to a brazing temperature.

8. The method of claim 7 wherein the metal component is titanium and the braze material is gold.

9. The method of claim 8 wherein the temperature is about 1000–1100° C.

10. The method of claim 9 wherein the heating is accomplished in a vacuum.

11. The method of claim 7 wherein the niobium coatings are about 5000–10,000 angstroms in thickness.

12. The method of forming a hermetic seal between a ceramic component and a titanium component, comprising:
   coating the areas on each component which are to be sealed together with niobium;
   placing the coated areas together against an interposed quantity of gold; and
   heating the assembly in vacuum to a brazing temperature.

13. The method of claim 12 wherein the ceramic is alumina.

* * * * *